(12) United States Patent
O'Brien et al.

(10) Patent No.: US 8,723,075 B2
(45) Date of Patent: May 13, 2014

(54) LASER MACHINING OF FIRED CERAMIC AND OTHER HARD AND/OR THICK MATERIALS

(75) Inventors: James N. O'Brien, Bend, OR (US); Peter Y. Pirogovsky, Portland, OR (US); Michael S. Nashner, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 172 days.

(21) Appl. No.: 13/326,133

(22) Filed: Dec. 14, 2011

(65) Prior Publication Data

US 2012/0103953 A1    May 3, 2012

Related U.S. Application Data

(62) Division of application No. 12/060,023, filed on Mar. 31, 2008, now Pat. No. 8,093,532.

(51) Int. Cl.
*B23K 26/14* (2006.01)
*B23K 26/36* (2006.01)

(52) U.S. Cl.
USPC .................................. 219/121.68; 219/121.84

(58) Field of Classification Search
USPC ............................ 219/121.63–121.72, 121.84
See application file for complete search history.

(56) References Cited

U.S. PATENT DOCUMENTS

| 3,521,187 A | 7/1970 | Snavely et al. |
| 4,447,701 A | 5/1984 | Brown |
| 4,780,592 A * | 10/1988 | Rothe et al. ............... 219/121.67 |
| 4,877,939 A | 10/1989 | Duley et al. |
| 5,359,176 A | 10/1994 | Balliet, Jr. et al. |
| 5,400,311 A | 3/1995 | Komma et al. |
| 5,756,962 A | 5/1998 | James et al. |
| 6,010,497 A | 1/2000 | Tang et al. |
| 6,204,475 B1 | 3/2001 | Nakata et al. |

(Continued)

FOREIGN PATENT DOCUMENTS

| CN | 1857843 A | 11/2006 |
| CN | 1965393 A | 5/2007 |

(Continued)

OTHER PUBLICATIONS

Office Action mailed Apr. 20, 2011 for U.S. Appl. No. 12/060,023, filed Mar. 31, 2008.

(Continued)

*Primary Examiner* — Samuel M Heinrich
(74) *Attorney, Agent, or Firm* — Stoel Rives LLP

(57) ABSTRACT

Laser machining fired ceramic and other hard and/or thick materials includes scribing a workpiece with a laser beam along a sequence of parallel laser paths within a cutout region of the workpiece. The scribing creates a kerf in the cutout region that widens as the laser beam advances along the sequence. The sequence may begin with an inner portion of the cutout region and end with an outer edge thereof such that debris is directed away from the laser paths to increase throughput and create a high quality opening in the workpiece. High quality structures may also be cut out from the workpiece. The method includes directing a high velocity stream of gas to an interlace of the laser beam and the workpiece to redirect the flow of debris and cool the interface. The method may also adjust a focus depth of the laser beam as it deepens the kerf.

11 Claims, 6 Drawing Sheets

(56) References Cited

U.S. PATENT DOCUMENTS

| | | |
|---|---|---|
| 6,407,363 B2 | 6/2002 | Dunsky et al. |
| 6,676,878 B2 * | 1/2004 | O'Brien et al. ............... 264/400 |
| 7,214,904 B2 | 5/2007 | Zeltner |
| 7,700,413 B2 | 4/2010 | Kusunoki |
| 8,093,532 B2 | 1/2012 | O'Brien et al. |
| 2003/0006220 A1 | 1/2003 | Cummings et al. |
| 2006/0065147 A1 | 3/2006 | Ogawa |
| 2007/0227907 A1 | 10/2007 | Shah et al. |
| 2008/0032236 A1 | 2/2008 | Wallace et al. |
| 2009/0045179 A1 | 2/2009 | Williams |

FOREIGN PATENT DOCUMENTS

| | | |
|---|---|---|
| EP | 1618985 A1 | 1/2006 |
| FR | 2810913 A1 | 1/2002 |
| JP | 11320171 A | 11/1999 |
| JP | 2003062683 A | 3/2003 |
| JP | 2003071530 A | 3/2003 |
| JP | 2006024914 A | 1/2006 |
| SU | 1750900 A1 | 7/1992 |

OTHER PUBLICATIONS

Notice of Allowance mailed Sep. 8, 2011 for U.S. Appl. No. 12/060,023, filed Mar. 31, 2008.

International Search Report and Written Opinion mailed Dec. 4, 2009 for PCT/US2009/038319, filed Mar. 26, 2009.

* cited by examiner

LASER MACHINING OF FIRED CERAMIC AND OTHER HARD AND/OR THICK MATERIALS

RELATED APPLICATION

This application is divisional of U.S. patent application No. 12/060,023, filed Mar. 31, 2008, which is hereby incorporated by reference herein in its entirety.

TECHNICAL FIELD

This application relates to laser machining and, in particular, to a method for improving throughput and quality when laser machining fired ceramics and other hard and/or thick materials.

BACKGROUND INFORMATION

Generally, fired ceramics and other hard and/or thick materials may be machined using lasers. Other machining processes may also be used such as grinding or chemical etching. However, grinding and other mechanical processes provide limited machining resolution. Further, hard and abrasive materials such as fired ceramic wear down mechanical devices used during the machining process.

In addition to ceramics, other hard materials may include, but are not limited to, single crystal silicon, multicrystalline silicon, metal, glass, sapphire, and zirconium. When machining such materials, including fired ceramic, it is typically desirable to increase throughput and quality.

Ceramic is generally processed in either a green state or a fired state. In the green state, before the ceramic has been heated or baked, it is relatively soft and easy to process. However, the process of firing the ceramic tends to change or distort the dimensions of features initially machined in the green ceramic. Thus, when precise dimensions and geometries are desired for the end product, processing green ceramic before it is fired may not provide sufficient quality. Fired ceramic, however, is substantially harder than green ceramic and relatively more difficult to machine. Thus, throughput is generally lower when machining fired ceramic as compared to green ceramic.

When using a laser to machine fired ceramic, higher laser power may be used for faster processing. However, increasing laser power may result in the final product having a quality that is less than adequate. Known laser techniques may produce excessive heat and debris that may cause, for example, edge roughness and thermal damage.

As the material thickness and laser depth of focus increase, it is generally more difficult to achieve the throughput and quality desired. Debris from the laser machining process typically limits throughput and quality. For example, conventional laser cutting profiles may suffer from trench backfill of laser ejected material. When the material thickness is increased, this backfill becomes more severe and reduces machining efficiency. Further, for some materials under many process conditions, the ejected backfill material may be more difficult to remove on subsequent passes than the original target material. Thus, cuts of low quality are created that can damage the material and require additional cleaning.

Lowering laser power may be used to improve quality. However, using a lower laser power may result in reduced throughput.

SUMMARY OF THE DISCLOSURE

The embodiments disclosed herein improve throughput and quality when laser machining fired ceramics and other hard and/or thick materials. In one embodiment, a method of laser machining a fired ceramic or other hard material includes scribing a workpiece with a laser beam along a sequence of parallel laser paths within a cutout region of the workpiece. The scribing creates a kerf in the cutout region that widens as the laser beam advances from a first laser path to a second laser path in the sequence. The method also includes directing a high velocity stream of gas to an interface between the laser beam and the workpiece. The stream of gas directs debris (generated by an interaction of the laser beam with the workpiece) away from unprocessed portions of the sequence of parallel laser paths.

The method may also include setting a first focus depth of the laser beam, directing a first pass of the laser beam along one or more of the parallel laser paths to remove a first portion of the workpiece corresponding to the first focus depth, setting a second focus depth of the laser beam, and directing a second pass of the laser beam along the one or more parallel laser paths to remove a second portion of the workpiece corresponding to the second focus depth.

In certain embodiments, the sequence begins with an inner portion of the cutout region and ends with an outer edge of the cutout region. Thus, scribing the workpiece along the sequence of parallel laser paths cuts a series of parallel steps within the kerf descending from the inner portion of the cutout region to the outer edge of the cutout region. The method may also include cutting through the workpiece with the laser beam along the outer edge to remove the cutout region from the workpiece such that directing the debris away from the sequence of parallel laser paths allows the outer edge to be substantially smooth and free from the debris.

In other embodiments, the sequence begins with an outer edge of the cutout region and moves toward an inner portion of the cutout region. In such embodiments, cutting through the workpiece with the laser beam may remove a structure from the inner portion of the cutout region. Directing the debris away from the sequence of parallel laser paths allows the structure to be substantially smooth and free from the debris. The method may include scribing the workpiece along the sequence of parallel laser paths to cut a series of parallel steps within the kerf descending from the outer edge of the cutout region toward the structure being cut from the cutout region.

In certain embodiments, directing the high velocity stream of gas to the interface may include blowing the stream of gas through a nozzle at supersonic speed. The nozzle may be located within, for example, 20 mm of the interface such that the stream of gas is still at a substantially high velocity as it reaches the surface of the workpiece. In some embodiments, the gas may be, for example, air, oxygen, carbon dioxide, argon, helium or nitrogen.

In one embodiment, a laser processing system for machining a fired ceramic or other hard material includes a laser to generate a laser beam. The laser beam is configured to scribe the workpiece along a sequence of parallel laser paths within a cutout region of the workpiece. The system also includes a nozzle to direct a high velocity stream of gas to an interface between the laser beam and the workpiece. In certain embodiments, the system also includes optics to focus the laser beam at a first focus depth during a first pass along one or more of the laser paths and at a second focus depth during a second pass along the one or more of the laser paths. The nozzle may include a convergent-divergent nozzle, such as a Laval nozzle, capable of blowing the stream of gas at a supersonic velocity.

In one embodiment, a laser processing system for machining a fired ceramic or other hard material includes means for scribing a workpiece along a sequence of parallel laser paths within a cutout region of the workpiece, and means for directing a high velocity stream of gas to an interface between the laser beam and the workpiece. The system may also include means for focusing the laser beam at a first focus depth during a first pass along one or more of the laser paths and at a second focus depth during a second pass along the one or more of the laser paths.

Additional aspects and advantages will be apparent from the following detailed description of preferred embodiments, which proceeds with reference to the accompanying drawings.

DETAILED DESCRIPTION OF PREFERRED EMBODIMENTS

Figure 1A:
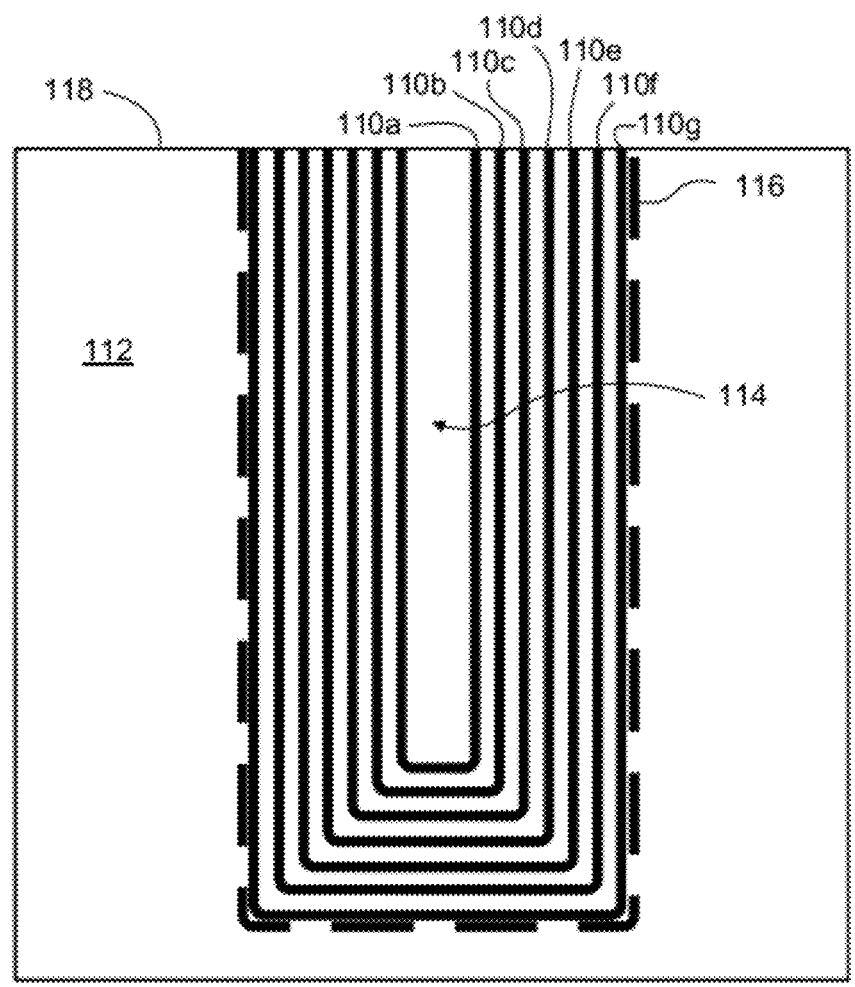
FIGS. 1A, 1B and 1C are schematic diagrams illustrating a plurality of parallel laser paths for cutting a hole through a workpiece according to certain embodiments.

A method for laser machining a fired ceramic or other hard and/or thick material according to certain embodiments includes selecting a laser beam path so as to provide an escape for debris as a laser cuts into or through a workpiece. In one embodiment, a sequence of parallel laser cuts begins inside a cutout region and moves toward an outer edge of the cutout region. The sequence of parallel laser cuts allows for a cleaner and deeper outer edge of the cutout region.

In addition, or in other embodiments, the method includes directing air or another gas at a high velocity to an area on the workpiece being processed by the laser beam. The high velocity air or gas improves edge quality and improves throughput by allowing the laser to focus on unprocessed material instead of debris. Blowing high velocity gas into the process area removes pieces of loose debris generated by laser ablation. The high velocity gas also cools the remaining material in the vicinity of laser beam interaction to reduce side effects such as heat affected zone (HAZ) and the reflow of melted material back into a kerf created by the laser beam. In certain embodiments, selection of a particular gas is used to control the laser/workpiece interface environment.

Multiple passes may be required to cut through a thick workpiece. Thus, in some embodiments, the method also includes adjusting the laser focus position to match the new surface of the workpiece on each subsequent pass to improve throughput. After cutting through the workpiece, or nearly through the workpiece, the outer line is cut to produce a clean edge at the entrance and exit (e.g., the top and bottom) of the cutout region.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1A is a schematic diagram illustrating a plurality of parallel laser paths 110a, 110b, 110c, 110d, 110e, 110f, 110g (collectively referred to as laser paths 110) for cutting a hole through a workpiece 112 according to one embodiment. The workpiece 112 may comprise a fired ceramic or other hard and/or thick material. The laser paths 110 define a cutout region 114 that includes an outer edge 116 (shown with a dashed line). In this example embodiment, the material within the cutout region 114 is removed from the workpiece 112 to create an opening therein.

A laser beam (not shown) is configured to sequentially follow the laser paths 110 from an innermost laser path 110a within the cutout region 114 toward the outer edge 116 of the cutout region 114. In other words, the laser beam sequentially follows the parallel laser paths 110a, 110b, 110c, 110d, 110e, 110f, and 110g. As discussed below, the kerf created by the laser beam becomes wider and deeper with each pass along the laser paths 110 such that the laser beam cuts through the workpiece 112 at or near the outer edge of the cutout region 114. The inner portion of the cutout region 114 may then be discarded, leaving a clean outer edge 116.

Figure 1B:
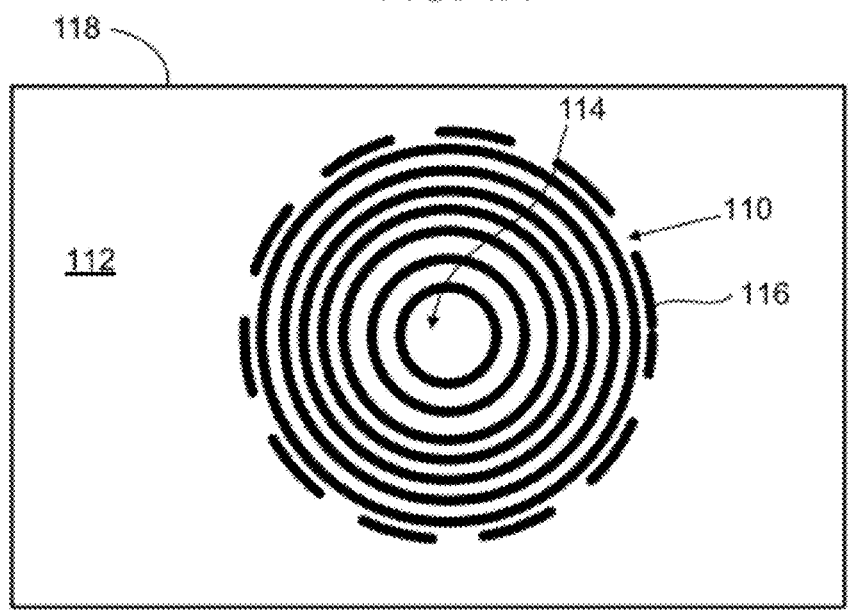

In FIG. 1A, the cutout region 114 includes a rectangular area at an edge 118 of the workpiece 112. However, an artisan will recognize from the disclosure herein that a hole or other structure may be machined according to any shape, and may be located anywhere on the workpiece 112. For example, FIG. 1B illustrates a circular cutout region 114 positioned within the workpiece 112. In this example embodiment, the parallel laser paths 110 are concentric circles centered at the center of the cutout region 114. Although not shown, in other embodiments, the laser paths 110 may be, for example, a continuous path spiraling from within the cutout region 114 toward the outer edge 116 of the cutout region 114.

Figure 1C:
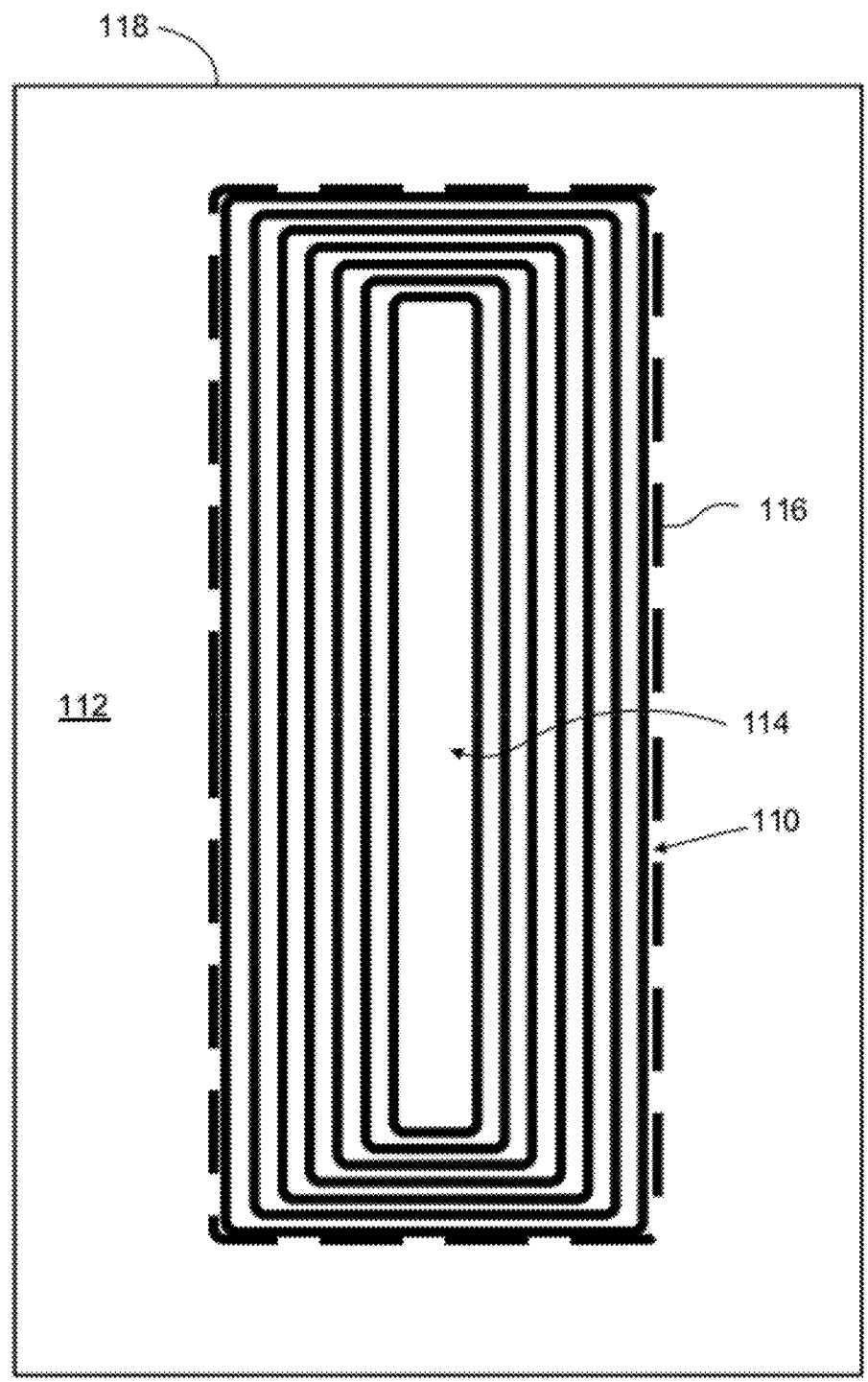

FIG. 1C illustrates another example embodiment, wherein a rectangular cutout region 114 is not adjacent to an edge 118 of the workpiece 112 (as shown in FIG. 1A). In this embodiment, each laser path 110 is discrete, rectangular and proportional to the outer edge 116 of the cutout region 114. However, as with the spiral path for creating the circular cutout region 114 shown in FIG. 1B, the laser path for the rectangular cutout region 114 shown in FIG. 1C may also be continuous in an increasing rectangular pattern from within the cutout region 114 toward the outer edge 116 (e.g., in a rectangular spiral). Moving around the sequence of laser paths 110 (e.g., clockwise) creates a void and allows debris to flow toward the center of the cutout area 114 and away from the outer edge 116 and/or away from the laser paths 110.

In one embodiment, the laser beam may make multiple passes along each laser path 110 in order to cut through the workpiece 112. Referring to FIG. 1A, for example, the laser beam according to one embodiment makes a plurality of passes along each of the parallel laser paths 110. For example, in a first pass at a first focus depth the laser beam may sequentially follow the parallel laser paths 110a, 110b, 110c, 110d, 110e, 110f, and 110g. In a second pass at a second focus depth, the laser beam may again sequentially follow the parallel laser paths 110a, 110b, 110c, 110d, 110e, 110f, and 110g. This process may be repeated, as appropriate, to process the particular workpiece 112.

Figure 2A:
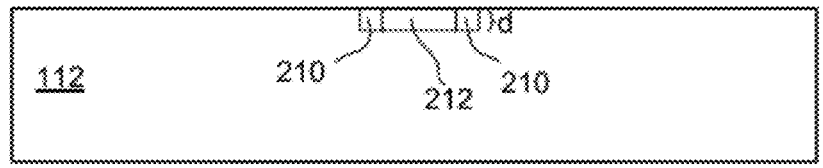
FIGS. 2A, 2B, 2C, 2D, 2E, 2F and 2G are schematic diagrams respectively illustrating cross-sectional side views of a workpiece in different processing stages as a laser beam sequentially deepens and widens a kerf in a cutout region according to one embodiment.
Figure 2B:
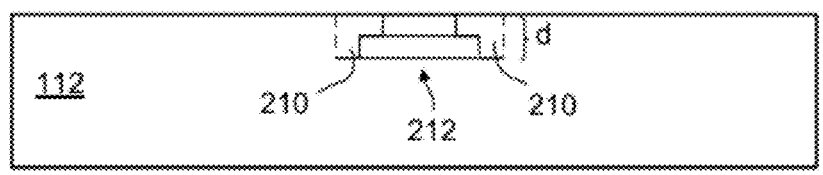
Figure 2C:
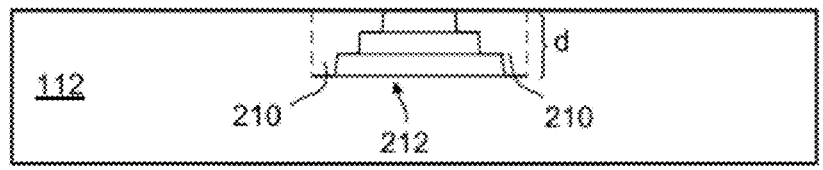
Figure 2D:
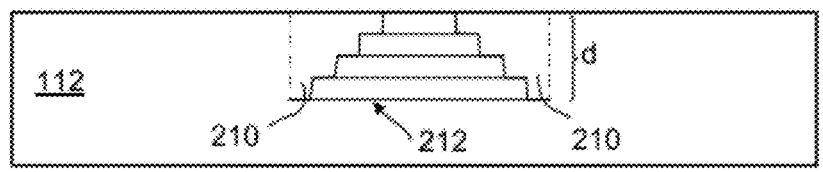
Figure 2E:
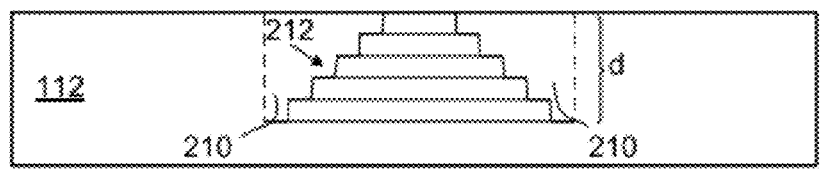
Figure 2F:
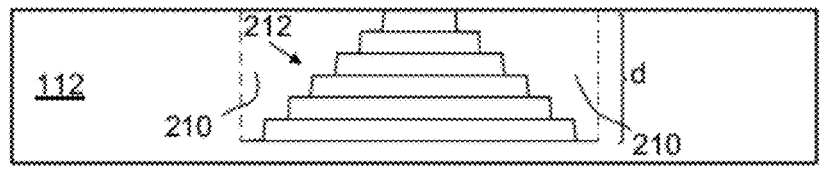
Figure 2G:
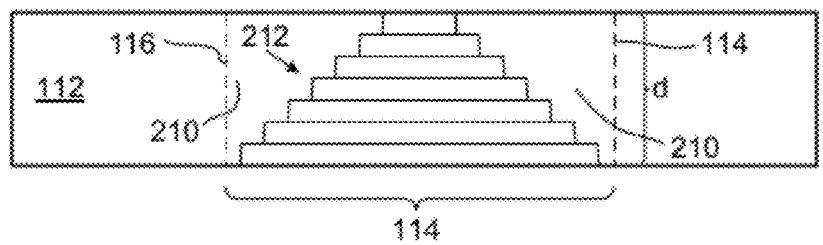

In another embodiment, the number of passes of the laser beam may be different along different paths 110. For example, FIGS. 2A, 2B, 2C, 2D, 2E, 2F and 2G are schematic diagrams respectively illustrating cross-sectional side views of a workpiece 112 in different processing stages as a laser beam (not shown) sequentially deepens and widens a kerf 210 in a cutout region 114 according to one embodiment. As discussed above, the laser beam follows a sequence of laser paths to remove material from the kerf 210. In FIG. 2A, the laser beam follows a first laser path (e.g., laser path 110a in FIG. 1A) to remove a portion of the material to form a kerf 210 of depth "d." A central portion of the material 212 may remain surrounded, at least partially, by the kerf 210. In FIG. 2B, the laser beam follows a second laser path (e.g., laser path 110b in FIG. 1A) to remove an additional portion of the material to widen and deepen the kerf 210. In FIG. 2C, the laser beam follows a third laser path (e.g., laser path 110c in FIG. 1A). In FIG. 2D, the laser beam follows a fourth laser path (e.g., laser path 110d in FIG. 1A). In FIG. 2E, the laser beam follows a fifth laser path (e.g., laser path 110e in FIG. 1A). In FIG. 2F, the laser beam follows a sixth laser path (e.g., laser path 110f in FIG. 1A). In FIG. 2G, the laser beam follows a seventh laser path (e.g., laser path 110g in FIG. 1A).

The laser beam widens and deepens the kerf 210 as it sequentially follows the laser paths until the kerf 210 cuts through the workpiece 112 (e.g., in FIG. 2G). In some embodiments, the kerf 210 is sequentially deepened by overlapping a portion of the laser beam spots between laser beam paths. In addition, or in other embodiments, the laser beam may pass over one or more of the paths multiple times to increase the depth of the kerf 210. For example, the laser beam may pass over the first laser path 110a one time, the second laser path 110b two times, the third laser path 110c three times, and so forth. In some embodiments, the laser focus position is adjusted to match the depth of the new surface of the material on each successive pass. For example, if the workpiece 112 is thicker than the field of focus, then the focal depth may be adjusted as the depth "d" of the kerf 210 increases.

As the kerf 210 widens and deepens, it creates a void and an escape for debris. Thus, by sequentially following the laser paths, the debris flows away from the laser/material interface and/or portions of the laser path that have not yet been processed by the laser beam. After cutting through the workpiece 112, the outer edge 116 of the cutout region 114 is clean and well-defined. The remaining material 212 within the cutout region 114 may then be discarded.

Figure 3:
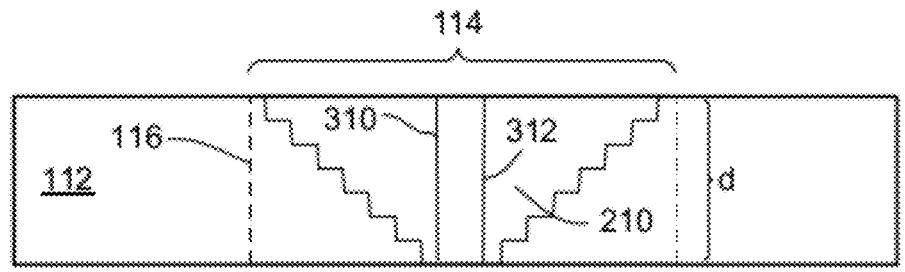
FIG. 3 is a schematic diagram illustrating a cross-sectional side view of a workpiece that is laser processed using laser paths that sequentially move toward the center of a cutout region according to one embodiment.

FIG. 3 is a schematic diagram illustrating a cross-sectional side view of a workpiece 112 that is laser processed using laser paths that sequentially move toward the center of a cutout region 114 according to one embodiment. An artisan will recognize from the disclosure herein that in certain applications it may be desirable to follow a sequence of paths from the inside of the cutout region 114 to the outer edge 116, as discussed above. This sequence may be desirable, for example, when cutting a hole in the workpiece 112 and discarding the material removed from the cutout area 114. However, an artisan will also recognize that in other applications it may be desirable for the sequence of laser paths to begin at the outer edge 116 and move toward the center of the cutout region 114 as the kerf 210 gets deeper. This sequence may be desirable, for example, when cutting a high quality part or structure 310 from the workpiece 112.

As shown in FIG. 3, starting the laser path from the outer edge 116 creates a sloping or step-like surface that remains part of the workpiece 112 as the kerf 210 deepens and moves toward the structure 310 to be cut from the workpiece 112. This step-like surface collects debris generated by the laser beam/material interaction. However, the structure 310 cut from the workpiece 112 has cut surfaces 312 that are relatively smooth and clean.

Figure 4:
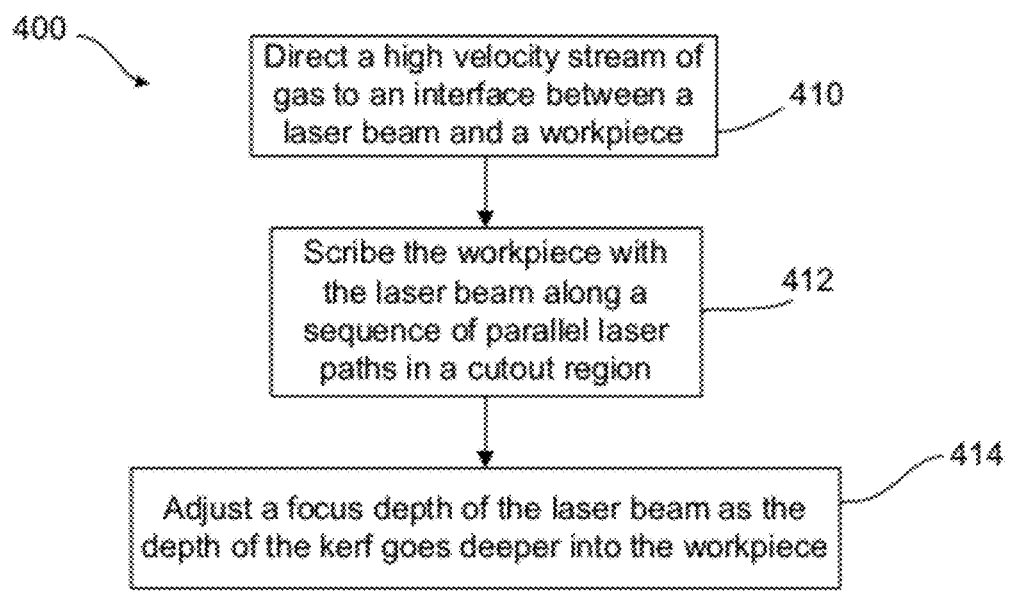
FIG. 4 is a flow diagram of a method for cutting an opening in fired ceramic or other hard and/or thick materials according to one embodiment.

FIG. 4 is a flow diagram of a method 400 for cutting an opening in a fired ceramic or other hard and/or thick material according to one embodiment. The method 400 includes directing 410 a high velocity stream of gas to an interface between a laser beam and a workpiece. The stream of gas may be a neutral gas such as helium, argon or nitrogen. In other embodiments, the stream of gas may be oxygen or an oxygen containing gas such as ambient air (e.g., a mixture of nitrogen and oxygen) or carbon dioxide, which may each cause some oxidation. In other embodiments, the stream of gas may be a more active gas that is selected for a particular application to control the laser/material interface environment.

The focused stream of gas travels at a high velocity (e.g., near supersonic) so as to alter the laser machining process by changing the laser processing conditions at the interface between the laser beam and the work piece. For example, in some embodiments, the stream of gas may produce an effect similar to a shockwave at the surface of the workpiece. The high velocity stream of gas mechanically removes pieces of loose debris generated by the laser machining process. The stream of gas also cools the remaining material proximate to the interface between the laser beam and the workpiece.

The method 400 also includes scribing 412 the workpiece with the laser beam along a sequence of parallel laser paths within a cutout region of the workpiece. The scribing creates a kerf in the cutout region that deepens and redirects at least a portion of the debris as the laser beam advances along the sequence of parallel laser paths. As discussed above, in one embodiment, the sequence of parallel laser paths begins with an inner portion of the cutout region and ends with an outer edge of the cutout region. In another embodiment, the sequence of laser paths begins at an outer edge of the cutout region and moves toward an inner portion of the cutout region.

In one embodiment, the method 400 also includes adjusting 414 a focus depth of the laser beam as the depth of the kerf goes deeper into the workpiece. Thus, the laser beam continues to efficiently remove material from the cutout region as the kerf deepens.

Thus, the method 400 may be used to improve the quality of parts or structures cut out from the work piece using laser processing, improve the quality of deep openings created in the workpiece during laser processing, and increase throughput of the laser processing by allowing the use of relatively higher powered lasers to increase the rate of material removal while maintaining laser processing quality. In some embodiments, throughput using the embodiments described herein has increased by as much as three to ten times that of conventional laser machining processes.

Figure 5:
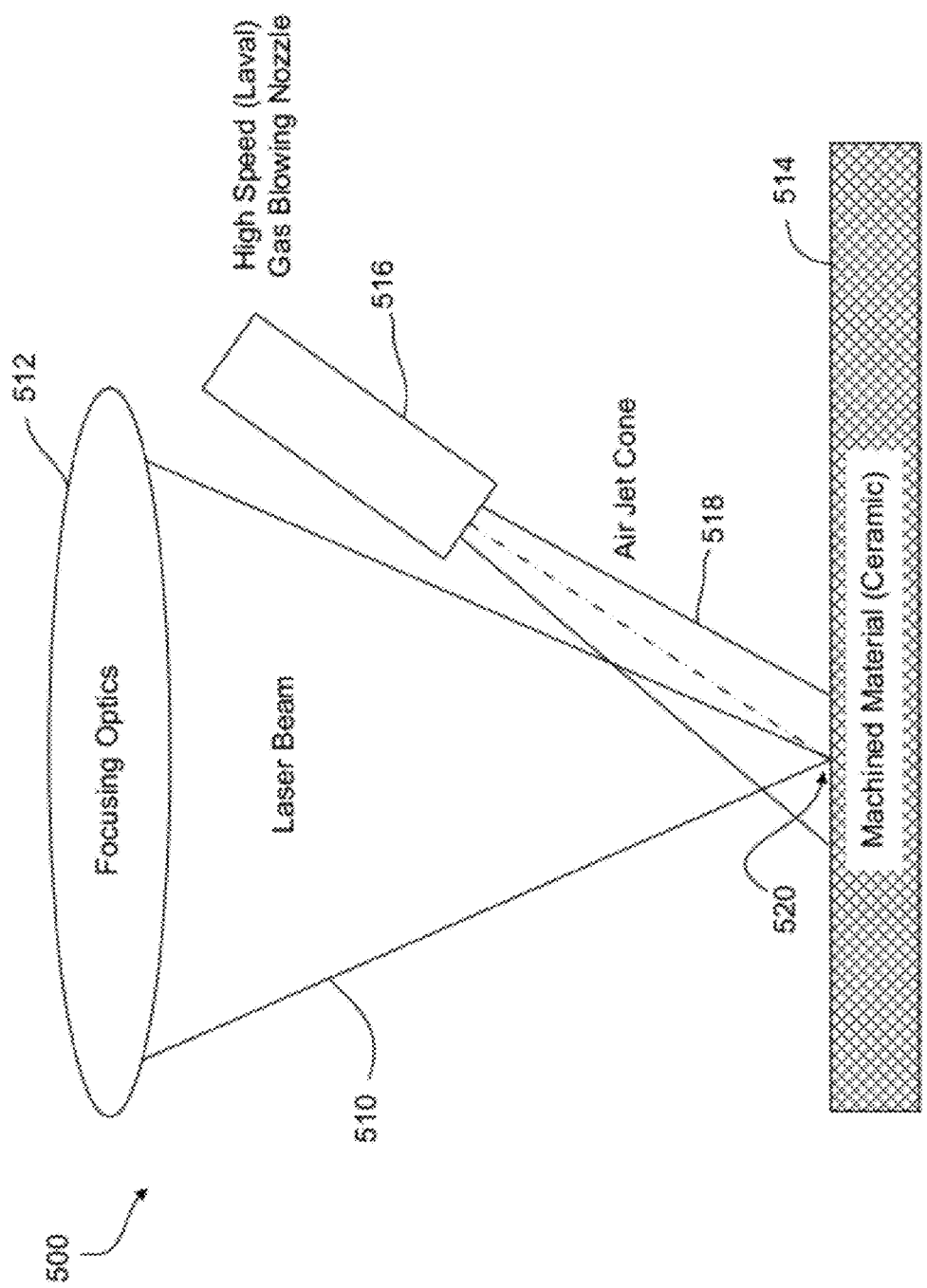
FIG. 5 is a block diagram of a system for laser machining fired ceramic or other hard and/or thick materials according to one embodiment.

FIG. 5 is a block diagram of a system 500 for laser machining fired ceramic or other hard and/or thick materials according to one embodiment. The system 500 includes a laser (not shown) for generating a laser beam 510, optics 512 for focusing the laser beam 510 at a desired depth relative to a machined material 514 (also referred to as workpiece 514), and a high speed gas blowing nozzle 516 to direct a high speed air jet cone 518 or stream of gas toward an interface 520 of the laser beam 510 and the workpiece 514. An artisan will recognize from the disclosure herein that the focal depth may also be adjusted by moving the workpiece 514 with respect to the laser and/or optics 512.

The system 500 is configured to improve both throughput and quality when cutting fired ceramics and other hard and/or thick materials. Laser selection for processing of these materials may be accomplished by those skilled in the art. The laser selection is typically based on the wavelength of the laser and the absorption characteristics of the machined material 514. In one example embodiment, the laser includes a pulsed Q-switched laser operating at a visible or ultraviolet wavelength. In certain such embodiments, the laser is operated at a pulse repetition rate higher than approximately 1 kHz with a laser pulse duration less than approximately 500 ns.

In one embodiment, the nozzle 516 includes a Laval nozzle or other gas blowing nozzle having a convergent—divergent design so as to create very high (including supersonic) gas flow velocity at the nozzle's opening. For example, the air velocity may be approximately 200 m/second, or faster. In certain such embodiments, the high velocity nozzle is positioned in a range between approximately 1 mm and approximately 100 mm from the interface 520 on the workpiece 514. Although not shown in FIG. 5, in some embodiments, a nose piece may be attached to the nozzle 516 to further focus and direct the air jet cone 518, as may be useful for certain applications.

In one example embodiment, the system 500 uses a third harmonic of a Q-switched Nd-Yag laser with a laser pulse width of approximately 40 ns, a pulse repetition rate of approximately 20 kHz, and an average power of approximately 7 W. In one such embodiment, the nozzle 516 includes a stainless steel Laval nozzle from Silvent North America, LLC having an office in Portage, Ind. The Laval nozzle 516 is located approximately 20 mm from the interface and directs the gas thereto at an angle of approximately 30 degrees from the normal to the surface of the workpiece 514. However, an artisan will recognize that other angles may be used between the Laval nozzle 516 and the surface of the workpiece 514. For example, the Laval nozzle 516 may be positioned coaxially with the laser beam. In one embodiment, the focal spot shape is Gaussian and the laser path is set as shown in FIG. 1.

Figure 6:
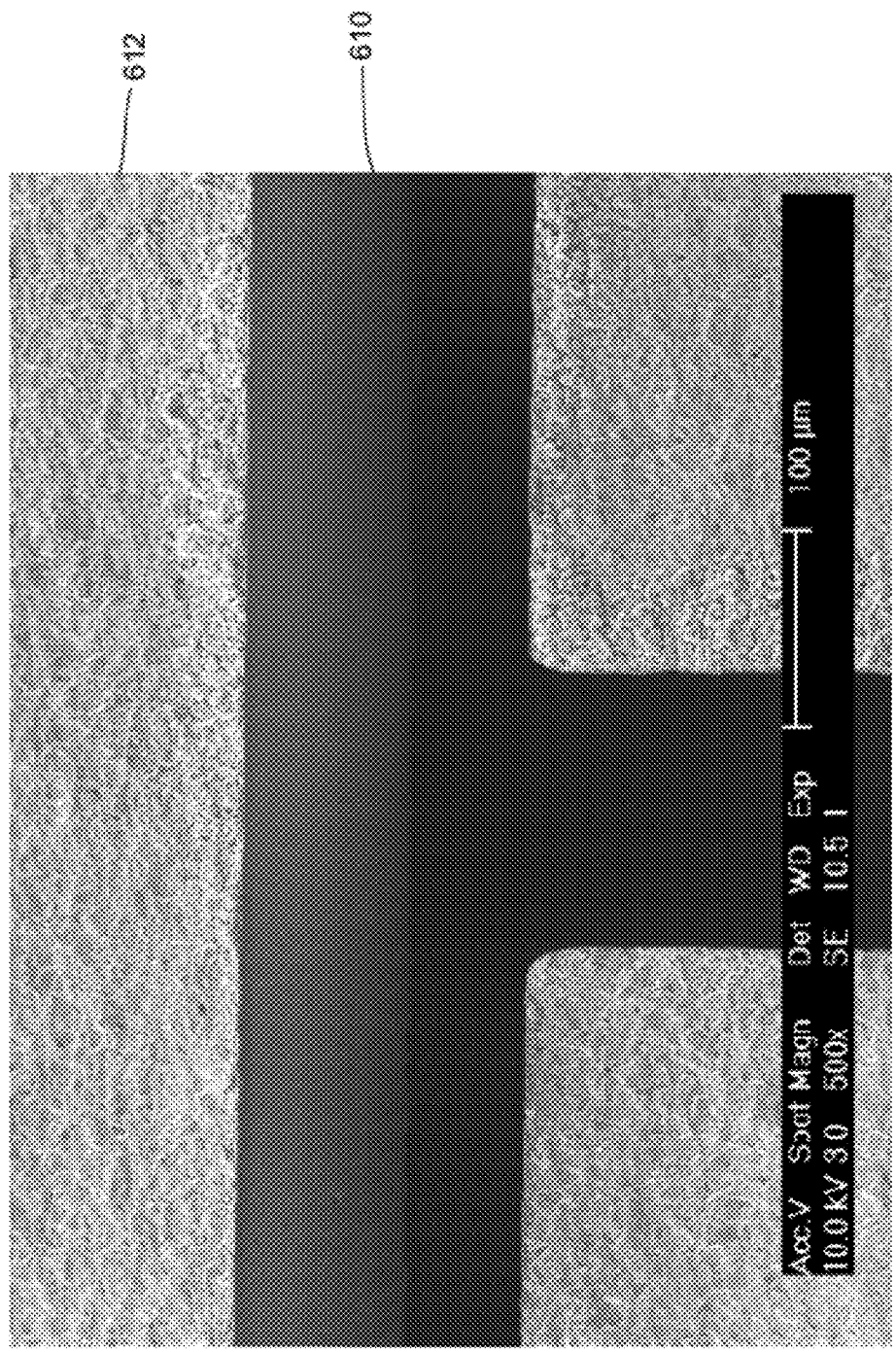
FIG. 6 is a scanning electron microscope image of a cut made in a fired ceramic material according to one embodiment.

FIG. 6 is a scanning electron microscope image of a cut 610 made in a fired ceramic material 612 according to the example embodiment described above. As shown in FIG. 6, the edges of the cut 610 are smooth and clean.

As discussed above, the embodiments disclosed herein may be used to machine fired ceramics and other hard and/or thick materials. Ceramics may be classified into distinct material categories including oxides (e.g., alumina and zirconia), non-oxides (e.g., carbides, borides, nitrides, and silicides), and composites (e.g., particulate reinforced combinations of oxides and non-oxides). Aluminium oxide, for example, is a chemical compound of aluminium and oxygen with the chemical formula $Al_2O_3$. It is also commonly referred to as alumina in the mining, ceramic and materials science industries. Example carbides include sodium carbide ($Na_2C_2$), silicon carbide (SiC), tungsten carbide (WC, often referred to simply as carbide), and cementite ($Fe_3C$, also referred to as iron carbide).

Barium titanate (often mixed with strontium titanate) is a ceramic that displays ferroelectricity, meaning that its mechanical, electrical, and thermal responses are coupled to one another and are also history-dependent. It is widely used in electromechanical transducers, ceramic capacitors, and data storage elements. Grain boundary conditions in barium titanate may create positive temperature coefficient (PTC) effects in heating elements.

Zirconia is another ceramic, which in pure form undergoes many phase changes between room temperature and practical sintering temperatures. Zirconia may be chemically "stabilized" in several different forms. Its high oxygen ion conductivity recommends it for use in fuel cells. In another variant, metastable structures may impart transformation toughening for mechanical applications. Most ceramic knife blades are made from zirconia.

The following example ceramic materials may also be machined using the methods disclosed herein: bismuth strontium calcium copper oxide, which is a high-temperature superconductor; boron carbide ($B_4C$), which is used in some personal, helicopter and tank armor; boron nitride, which is structurally isoelectronic to carbon and takes on similar physical forms (a graphite-like form used as a lubricant and a diamond-like one used as an abrasive); bricks (mostly aluminium silicates), which are used for construction; earthenware, which is often made from clay, quartz and feldspar; ferrite ($Fe_3O_4$), which is ferrimagnetic and is used in the core of electrical transformers and magnetic core memory; lead zirconate titanate, which is a ferroelectric material; magnesium diboride ($MgB_2$), which is an unconventional superconductor; porcelain, which usually includes the clay mineral kaolinite; silicon carbide (SiC), which is used as a susceptor in microwave furnaces, as a commonly used abrasive, and as a refractory material; silicon nitride ($Si_3N_4$), which is used as an abrasive powder; steatite, which is used as an electrical insulator; uranium oxide ($UO_2$), which is used as fuel in nuclear reactors; yttrium barium copper oxide ($YBa_2Cu_3O_{7-x}$), which is another high temperature superconductor; and zinc oxide (ZnO), which is a semiconductor, and which is used in the construction of varistors.

An artisan will recognize from the disclosure herein that many other types of ceramics may be machined using the embodiments disclosed herein. Further, as discussed above, other hard materials may be machined using the embodiments disclosed herein, such as (without limitation) single crystal silicon, multicrystalline silicon, metal, glass, and sapphire.

It will be understood by those having skill in the art that many changes may be made to the details of the above-described embodiments without departing from the underlying principles of the invention. The scope of the present invention should, therefore, be determined only by the following claims.

What is claimed is:

1. A laser processing system for machining a fired ceramic or other hard material, the system comprising:
    a laser to generate a laser beam, the laser beam configured to scribe a workpiece along a sequence of parallel laser paths within a cutout region of the workpiece, wherein the laser processing system is configured to control the scribing to create a kerf in the cutout region that widens and deepens as the laser beam advances from a first laser path to a second laser path in the sequence so as to create a series of parallel descending steps as an escape for debris generated by an interaction of the laser beam with the workpiece; and
    a nozzle to direct a high velocity stream of gas to an interface between the laser beam and the workpiece, wherein the laser processing system causes the stream of gas to direct the debris away from the sequence of parallel laser paths.

2. The system of claim 1, further comprising optics to focus the laser beam at a first focus depth during a first pass along one or more of the laser paths and at a second focus depth during a second pass along the one or more of the laser paths.

3. The system of claim 1, wherein the nozzle comprises a convergent-divergent nozzle capable of blowing the stream of gas at a supersonic velocity.

4. The system of claim 3, wherein the convergent-divergent nozzle comprises a Laval nozzle.

5. The system of claim 1, wherein the sequence of parallel laser paths begins with an inner portion of the cutout region and ends with an outer edge of the cutout region.

6. The system of claim 1, wherein the sequence of parallel laser paths begins with an outer edge of the cutout region and moves toward an inner portion of the cutout region.

7. The system of claim 1, wherein the nozzle is located within 20 mm of the workpiece.

8. The system of claim 1, wherein the gas is selected from the group comprising air oxygen and carbon dioxide.

9. The system of claim 1, wherein the gas comprises a neutral gas selected from the group comprising argon, helium and nitrogen.

10. A laser processing system for machining a fired ceramic or other hard material, the system comprising:

means for scribing a workpiece along a sequence of parallel laser paths with a cutout region of the workpiece, wherein the laser processing system is configured to control the scribing to create a kerf in the cutout region that widens and deepens as the laser beam advances from a first laser path to a second laser path in the sequences so as to create a series of parallel descending steps as an escape for debris generated by an interaction of the laser beam with the workpiece; and means for directing a high velocity stream of gas to an interface between the laser beam and the workpiece, wherein the laser processing system causes the stream of gas to direct the debris away from the sequence of parallel laser paths.

11. The system of claim 10, further comprising means for focusing the laser beam at a first focus depth during a first pass along one or more of the laser paths and at a second focus depth during a second pass along the one or more of the laser paths.

* * * * *